2,769,802
Patented Nov. 6, 1956

2,769,802
POLYMERS OF DIVINYL SULFIDE AND METHODS FOR THEIR PRODUCTION

James E. Pritchard, Bartlesville, Okla., assignor to Phillips Petroleum Company, a corporation of Delaware No Drawing. Application December 8, 1952, Serial No. 324,825

4 Claims. (Cl. 260—79.7)

This invention relates to polymers of divinyl sulfide and methods for their production. In one of its aspects this invention relates to the copolymerization of divinyl sulfide with monoolefinic non-aromatic hydrocarbons in the presence of acid-acting catalysts to provide novel polymeric products. In another of its aspects this invention relates to the copolymerization of divinyl sulfide with isobutylene. In still another of its aspects this invention relates to the polymerization of divinyl sulfide to provide homopolymers of divinyl sulfide of improved color.

Each of the foregoing aspects of this invention will be accomplished by at least one of the objects of this invention.

It is an object of this invention to provide novel polymers of divinyl sulfide and methods for their production.

Another object of this invention is to provide novel copolymers of divinyl sulfide with monoolefinic non-aromatic hydrocarbons.

A further object of this invention is to provide novel copolymers of divinyl sulfide and isobutylene.

Still another object of this invention is to provide novel homopolymers of divinyl sulfide of improved color.

Divinyl sulfide is a relatively rare monomer, having become available only recently in limited quantities. It is prepared by the dehydration of thiodiglycol or by the decomposition of hydrogen sulfide-ethylene oxide addition products.

I have found that divinyl sulfide and monoolefinic non-aromatic hydrocarbons containing from 2 to 18 carbon atoms can be readily copolymerized to provide novel polymeric products. Also, I have discovered that acid-acting catalysts such as aluminum chloride, boron fluoride, sulfuric acid and the like are excellent materials for catalyzing the copolymerization of divinyl sulfide with monoolefinic non-aromatic hydrocarbons to provide novel polymeric products. The novel products obtained by my copolymerization vary from white viscous liquids to light colored granular infusible solids. These products are water insoluble and resistant to the action of dilute alkalis, dilute acids and aqueous salt solutions. These products are of varying solubilities in benzene depending upon their composition and upon the conditions under which polymerization is effected. For example, products which were formed by reaction of more than one mol of divinyl sulfide per mol of hydrocarbon and copolymerized under one set of conditions with a given catalyst have low benzene solubility and products which were formed by reaction of more than one mol of hydrocarbon per mol of divinyl sulfide and copolymerized under different conditions with the same catalyst have increased benzene solubility. In general, the benzene solubility of the products produced is dependent upon the ratio of combined divinyl sulfide to hydrocarbon, the particular catalyst employed and the conditions of polymerization. The solid copolymers produced in accordance with my invention are useful for the production of oil resistant gaskets, seals, hose and the like. The liquid copolymers produced have potential use as rubber softeners.

Monomers which may be copolymerized with divinyl sulfide in accordance with my invention are the monoolefinic non-aromatic hydrocarbons containing from 2 to 18 carbon atoms per molecule. By "non-aromatic" I mean containing no aromaticsubstitution. Examples of straight chain monoolefins which can be employed include ethylene, propene, butene-1, butene-2, pentene-1, pentene-2, hexene-1, heptene-1, octene-1, nonene-1, decene-1, dodecene-1, hexadecene-1, octadecene-1 and the like. Branched chain monoolefins which can be employed include isobutylene, isopentene, 2,3-dimethylbutene-2, 2-methyl-4-ethylhexene-3 and the like. The preferred monomers which can be employed are the 1-olefins, both straight and branched chain. The most preferred monomer copolymerizable with divinyl sulfide in accordance with my invention is isobutylene. Further examples of monoolefinic non-aromatic hydrocarbons which can be copolymerized in accordance with my invention include the cyclomonoolefinic hydrocarbons such as cyclobutene, cyclopentene, cyclohexene, cycloheptene and cyclooctene and alkyl substituted derivatives of same such as 4-methylcyclohexene-1, 4-ethylcycloheptene-1 and the like. Mixtures of the above olefins can also be employed. The mol ratio of divinyl sulfide to monoolefinic non-aromatic hydrocarbon employed is in the range up to 1 to 50, preferably between 1 to 0.3 and 1 to 50, still more preferably 1 to 1 and 1 to 50.

Catalysts applicable to use according to the method of the present invention include acid-acting catalysts such as aluminum chloride, aluminum bromide, boron fluoride, hydrogen fluoride, sulfuric acid, aryl sulfonic acids such as p-toluene sulfonic acid, phosphoric acid, phosphorus pentoxide, titanium tetrachloride, tin chloride, zinc chloride, antimony chloride and the like. Boron fluoride can be employed in the form of complexes such as the hydrate, alcoholate, etherate, or phosphate. Complexes of other of the above catalysts are also useful in this invention. The mineral acids can be employed in the form of aqueous solutions having a concentration of at least 50 weight percent. The amount of catalyst employed will be in the range from 0.05 to 20 percent of the weight of the monomers, preferably from 0.5 to 10 percent by weight of the monomers.

The temperature at which copolymerization can be effected varies within wide limits preferably in the range of $-100$ to $100°$ C., depending upon the catalyst employed and the monomer copolymerized with divinyl sulfide.

The process of the present invention is preferably conducted under the autogenous pressure of the system. In some instances pressures higher than these can be employed if desired. In any event, it is preferred that the reaction be carried out with at least a portion of the reactants in the liquid phase.

In a typical method of operating according to the present invention, divinyl sulfide and a monoolefinic non-aromatic hydrocarbon, such as isobutylene, in a mol ratio of 1 to 0.3 to 1 to 50 are charged to a reactor at a temperature preferably in the range of from $-60$ to $0°$ C. A suitable amount of catalyst such as aluminum chloride is added and the polymerization begins immediately and is allowed to proceed for a period preferably of from 0.5 to 20 hours or until no further appreciable reaction is observed. Sufficient water or alkali is added to deactivate the catalyst and unreacted monomers are removed by any suitable method such as distillation and recovered and the product then washed and dried.

In the operation of the present invention, it is sometimes desirable to employ a diluent, nonreactive with the monomers under reaction conditions for the reaction mixture. Paraffinic hydrocarbons can be used for this purpose and include compounds containing from 3 to 10 carbon atoms. In addition diluents such as methylchloride and the like can be employed. The amount of diluent is in the range from 0 to 7 parts diluent per part of monomers, preferably from 1 to 3 parts diluent per part monomer.

The process of the present invention is applicable to continuous as well as to batch operation.

In addition to the copolymerization of divinyl sulfide with monoolefinic non-aromatic hydrocarbons containing from 2 to 18 carbon atoms per molecule as hereinabove disclosed, the present invention is also applicable to the polymerization of dinvinyl sulfide alone.

It has been previously observed that pure monomeric divinyl sulfide polymerizes during storage at room temperature. However, homopolymers heretofore observed have been highly colored, and further, polymerization for practical purposes of divinyl sulfide alone even in the presence of pure oxygen at room temperature requires several days. Accordingly I have discovered that polymers of divinyl sulfide of good color can be produced in short reaction periods by employing acid-acting catalysts as hereinbefore described.

The preferred temperature employed for the polymerization of divinyl sulfide alone is in the range between −100 to 0° C.

The products obtained by my polymerization of divinyl sulfide are granular solids of light color, usually white, which are infusible and substantially insoluble in common organic solvent such as benzene, toluene, acetone, methanol, ethanol, isopropanol, butanol, pyridine and others. In addition these products are water insoluble and resistant to the action of dilute alkalis, dilute acids and aqueous salt solutions. They are swelled slightly and become translucent in the presence of chloroform. These divinyl sulfide polymers are useful in the production of oil resistant gaskets, seals, hose, etc., and for the manufacture of the plastic products such as heat resistant handles, knobs, drawer pulls, and the like.

*Example I*

Divinyl sulfide and isobutylene were copolymerized using varying monomer ratios and temperatures, employing aluminum chloride and boron fluoride as catalysts. A polymerization of isobutylene alone using aluminum chloride was run as a comparison. The diluents employed were methyl chloride and n-pentane. The monomer-diluent ratio was approximately 1 to 3. Catalyst solutions were prepared in the reactor just prior to conducting the polymerization. Weighed amounts of methyl chloride and aluminum chloride were mixed and the solution was allowed to reflux for 0.5 hour.

In the boron fluoride catalyzed polymerization gaseous boron fluoride was bubbled continuously through the reaction mixture during the reaction period.

Polymerizations were stopped by the addition of a small quantity of distilled water which inactivated the catalyst. Unpolymerized isobutylene and diluents were removed by distillation and recovered, after which the products were washed with water and dried. Solubility of the polymers was determined by adding an accurately weighed amount (usually about 0.1 gm.) of polymer to an accurately measured amount of benzene (usually about 50 ml.), agitating the mixture for a short period and allowing same to stand overnight. An aliquot of the mother liquor was then analyzed to determine the percent dissolved of the original amount of polymer. Results are recorded in the following table.

| Run Number | 1 | 2 | 3 | 4 | 5 |
| --- | --- | --- | --- | --- | --- |
| Recipe: | | | | | |
| Isobutylene | 15.6 g | 10.0 g | 15.3 g | 31.5 g | 14.6 g. |
| Divinyl sulfide | 1.6 g | 0.5 g | 0.8 g | 1.5 g | |
| Catalyst | 0.4–0.5 g. AlCl$_3$ | Gaseous BF$_3$ | 0.2–0.3 g. AlCl$_3$ | 0.2 g. AlCl$_3$ | 0.3–0.4 g. AlCl$_3$. |
| Diluent | 45 g. CH$_3$Cl | 45 g. n-pentane | 45 g. CH$_3$Cl | 50 g. CH$_3$Cl | 85 g. CH$_3$Cl. |
| Duration of reaction | 5.5 hrs | 6 hrs | 6 hrs | 8 hrs | 5.5 hrs. |
| Temperature | −24° C | −40° C | −35° to −40° C | −40° to −50° C | −20° to −45° C. |
| Description of Product | White, granular, infusible solid. | White, viscous liquid | White oil of low density, sticky. | White puttylike | Slightly cloudy, highly viscous liquid. |
| Sulfur Content | 15.2% | 3.5% | 4.8% | 15.8% | |
| Solubility of product in benzene percent of original amount. | 45.7% | 15.7% | 61.1% | | Complete solubility. |

*Example II*

To a mixture of 9.5 grams of cyclohexene and 0.5 gram of divinyl sulfide 0.6 gram of aluminum chloride was added. The reactor was capped and heated at 70° C. for 14 hours. The reaction mixture was washed with water to remove aluminum chloride and rinsed with isopropanol. A yellow granular product was obtained. This material was insoluble in alcohol and ether, was infusible but burned without leaving an ash. After washing three times with ether, sulfur analysis showed this material to contain 28.1 percent sulfur.

*Example III*

A run similar to that of Example II was made in which 8.5 grams of cyclohexene, 0.4 gram of divinyl sulfide and 0.55 gram of aluminum chloride was heated at 70° C. for 60 hours. The mixture was washed with water and allowed to dry. A yellow, granular solid was obtained. After three washings with ether the sulfur content was found to be 27.8 percent. It will be noted that the sulfur determinations of this and the preceding examples are in close agreement. The values correspond to a ratio of one mol of cyclohexene to 3 mols of divinyl sulfide. The physical properties of the cyclohexene divinyl sulfide copolymer are significantly different from those of a cyclohexene homopolymer which is a yellow oil and which is soluble in ether as contrasted with the copolymer which is a granular solid insoluble in ether.

*Example IV*

A mixture of 9.5 grams of hexadecene-1, 0.5 gram of divinyl sulfide, and 0.6 gram of aluminum chloride was agitated for 3 weeks at room temperature (about 20° C.). The reaction mixture was washed with dilute acid to remove the aluminum chloride. The crude product was a heterogeneous mixture of an oil and solid particles. This mixture was washed with isopropanol and benzene and then washed thoroughly with ether. The resultant solid had a sulfur content of 17.2 percent. This percentage of sulfur would indicate an approximate mol ratio of divinyl sulfide to hexadecene-1 of 5:2. The homopolymer of hexadecene-1, which is a yellow oil insoluble in benzene and isopropanol, is slowly soluble in ether as contrasted to the solid copolymer insoluble in ether.

Example V

| Run Number | 1 | 2 | 3 | 4 |
|---|---|---|---|---|
| Recipe: | | | | |
| Divinyl sulfide | 2 cc. (2 g.) | 2 cc. (2 g.) | 2 cc. (2 g.) | 4 cc. (4 g.). |
| Catalyst and amount | 1 drop BF$_3$- etherate | O$_2$ of air | 0.1 g. AlCl$_3$ | 0.04 g. AlCl$_3$. |
| Diluent | | | 10–15 g. methyl chloride | 12 g. methyl chloride. |
| Time of Reaction | Substantially instantaneous. | Several weeks | 2 hrs | 7 hrs. |
| Temperature | Reaction was initiated in the range from −74° C. to −25° C. | 25° C | −24° C | −24° C. |
| Description of Product | White, granular solid | Yellow, very viscous liquid. | White, granular solid | Hard, infusible, slightly greenish solid; 3.1% soluble in benzene, calculated as hereinbefore noted. |

The foregoing examples are illustrative of my invention and should not be construed as unduly limiting thereof.

I claim:

1. A process for producing a copolymer which comprises contacting divinyl sulfide and a comonomer selected from the group consisting of isobutylene, cyclohexene and hexadecene-1 with a catalyst selected from the group consisting of aluminum chloride and boron trifluoride, at a temperature of −60 to 0° C. for a period of 0.5 to 20 hours, the mol ratio of divinyl sulfide to said comonomer being within the range of 1:0.3 to 1:50.

2. The process in accordance with claim 1 wherein the comonomer is isobutylene.

3. The process in accordance with claim 1 wherein the comonomer is cyclohexene.

4. The process in accordance with claim 1 wherein the comonomer is hexadecene-1.

References Cited in the file of this patent

UNITED STATES PATENTS

| | | |
|---|---|---|
| 2,125,649 | Reppe et al. | Aug. 2, 1938 |
| 2,609,363 | Welch | Sept. 2, 1952 |

FOREIGN PATENTS

| | | |
|---|---|---|
| 562,269 | Great Britain | June 26, 1944 |

OTHER REFERENCES

Davies: J. Chem. Soc. (London), 234, 5 (1931).

Norrish et al.; Proc. Royal Soc. (1937), A163, pages 205–220.